United States Patent
Collier et al.

(10) Patent No.: US 10,310,195 B2
(45) Date of Patent: Jun. 4, 2019

(54) ADIABATIC OPTICAL COUPLING SYSTEMS

(71) Applicant: Corning Optical Communications LLC, Hickory, NC (US)

(72) Inventors: Adam Kent Collier, Montour Falls, NY (US); Ying Geng, Sammamish, WA (US); Ming-Jun Li, Horseheads, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/591,615

(22) Filed: May 10, 2017

(65) Prior Publication Data

US 2017/0242204 A1     Aug. 24, 2017

Related U.S. Application Data

(63) Continuation of application No. PCT/US2015/059426, filed on Nov. 6, 2015.

(60) Provisional application No. 62/079,045, filed on Nov. 13, 2014.

(51) Int. Cl.
| | |
|---|---|
| *G02B 6/26* | (2006.01) |
| *G02B 6/42* | (2006.01) |
| *G02B 6/30* | (2006.01) |
| *G02B 6/028* | (2006.01) |

(52) U.S. Cl.
CPC ......... *G02B 6/4204* (2013.01); *G02B 6/0288* (2013.01); *G02B 6/262* (2013.01); *G02B 6/305* (2013.01); *G02B 6/4292* (2013.01)

(58) Field of Classification Search
CPC ........ G02B 6/26; G02B 6/262; G02B 6/4214; G02B 6/43; H01L 2924/00
See application file for complete search history.

(56) References Cited

U.S. PATENT DOCUMENTS

| | | | |
|---|---|---|---|
| 4,763,976 A | 8/1988 | Nolan et al. | |
| 4,807,954 A | 2/1989 | Oyamada et al. | |
| 6,200,502 B1 | 3/2001 | Paatzsch et al. | |
| 7,787,729 B2* | 8/2010 | Dong ................. | G02B 6/02357 385/123 |
| 9,235,097 B2* | 1/2016 | Meade ..................... | G02B 6/30 |
| 2005/0265653 A1 | 12/2005 | Cai et al. | |
| 2006/0222298 A1 | 10/2006 | Hatori | |

(Continued)

OTHER PUBLICATIONS

Presby et al; "Laser-To-Fiber Coupling Via Optical Fiber Up-Tapers"; Journal of Lightwave Technology. vol. 7. No. 2, pp. 274-278, Feb. 1989.

(Continued)

*Primary Examiner* — Jennifer Doan
(74) *Attorney, Agent, or Firm* — Adam R. Weeks

(57) ABSTRACT

An optical coupling system includes a tapered coupling element having a first end opposite a second end, a core having a core diameter that is larger at the first end than at the second end, and a cladding layer that is coupled to and circumscribes the core. An optical pathway is disposed within the core and that extends between the first end and the second end. The tapered coupling element is tapered from the first end to the second end such that the core diameter adiabatically transitions a light beam traveling along the optical pathway from a first beam size at the first end to a second beam size at the second end.

22 Claims, 10 Drawing Sheets

(56) References Cited

U.S. PATENT DOCUMENTS

2007/0237453 A1    10/2007   Nielsen et al.
2012/0262781 A1    10/2012   Price et al.
2014/0036351 A1    2/2014   Fini et al.

OTHER PUBLICATIONS

Weidel; "New Coupling Method for GaAs-Laser-Fibre Coupling"; Electronics Letters; vol. 11; Issue 18 (1975); pp. 436-437.
European Patent Office; International Search Report and Written Opinion of International Application No. PCT/US2015/059426; dated Aug. 25, 2016, pp. 1-12.
EP15864298.3 Notice of Allowance dated Feb. 27, 2019, European Patent Office, 7 pgs.

* cited by examiner

ADIABATIC OPTICAL COUPLING SYSTEMS

PRIORITY APPLICATION

This application is a continuation of International Patent Application Serial No. PCT/US15/59426, filed on Nov. 6, 2015, which claims the benefit of priority under 35 U.S.C. § 119 of U.S. Provisional Application Ser. No. 62/079,045, filed on Nov. 13, 2014, the contents of which are relied upon and incorporated herein by reference in their entireties.

FIELD

The present specification relates to optical coupling devices for coupling a light source to a receiving fiber.

BACKGROUND

Silicon photonic (SiP) transceivers can transport high data loads over long distances, and are therefore useful in data center applications. Single mode or small core, multimode optical fiber is desired in these applications because it can support high bandwidths. Currently, it is difficult to couple a SiP laser and an optical fiber at low cost. Further, it is difficult to couple small mode field light sources having a high numerical aperture with a single mode or a small core multimode fiber.

Accordingly, there is a desire for improved coupling devices that can couple a laser module to small core multimode or single mode fiber.

SUMMARY

In one embodiment, an optical coupling system includes a tapered coupling element having a first end opposite a second end, a core having a core diameter that is larger at the first end than at the second end, and a cladding layer that is coupled to and circumscribes the core. An optical pathway is disposed within the core and extends between the first end and the second end. The tapered coupling element is tapered from the first end to the second end such that the core diameter adiabatically transitions a light beam traveling along the optical pathway from a first beam size at the first end to a second beam size at the second end.

In another embodiment, an optical coupling system includes a light source optically coupled to a first end of a tapered coupling element. The light source is configured to generate a light beam. A lens system is disposed within an optical pathway between the light source and the first end of the tapered coupling element. The tapered coupling element includes the first end opposite a second end and a core including a core diameter that is larger at the first end than at the second end. A cladding layer is coupled to and circumscribes the core. The optical pathway is disposed within the core and extends between the first end and the second end. The tapered coupling element is tapered from the first end to the second end such that the core diameter adiabatically transitions the light beam traveling along the optical pathway from a first beam size at the first end to a second beam size at the second end. Further, a receiving fiber is optically coupled to the second end of the tapered coupling element.

In yet another embodiment, an optical coupling system includes a light source connector comprising a light source housing and a light source disposed within the light source housing and optically coupled to a first end of a tapered coupling element. The light source is configured to generate a light beam. A lens system is disposed within an optical pathway between the light source and the first end of the tapered coupling element. A tapered coupling element connector includes a tapered coupling element housing. The tapered coupling element is disposed within the tapered coupling element housing. The tapered coupling element includes the first end opposite a second end and a core including a core diameter that is larger at the first end than at the second end. A cladding layer is coupled to and circumscribes the core. The optical pathway is disposed within the core and extends between the first end and the second end. The tapered coupling element is tapered from the first end to the second end such that the core diameter adiabatically transitions the light beam traveling along the optical pathway from a first beam size at the first end to a second beam size at the second end. Further, a receiving fiber connecter includes a receiving fiber housing. A receiving fiber is disposed within the receiving fiber housing and is optically coupled to the second end of the tapered coupling element.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to optical coupling systems comprising a tapered coupling element for optically coupling a light source and a receiving fiber (e.g., a single mode or a small core multimode optical fiber). The tapered coupling element may comprise a core and a cladding layer and may be tapered adiabatically from a first end to a second end. The first end may be optically coupled to the light source and the second end may be optically coupled to the receiving fiber. The light source produces a light beam, such as a laser beam, and the receiving fiber may receive the light beam. The optical coupling systems disclosed herein provide a device to transform the light beam distribution of the light source to match the light beam distribution of the receiving fiber. Further, an alignment tolerance of the optical coupling system enables passive alignment, for example, the optical coupling system may provide a large offset alignment tolerance. Further, the tapered coupling element may not require the light source to be precision aligned to the receiving fiber, facilitating field installation.

Figure 1:
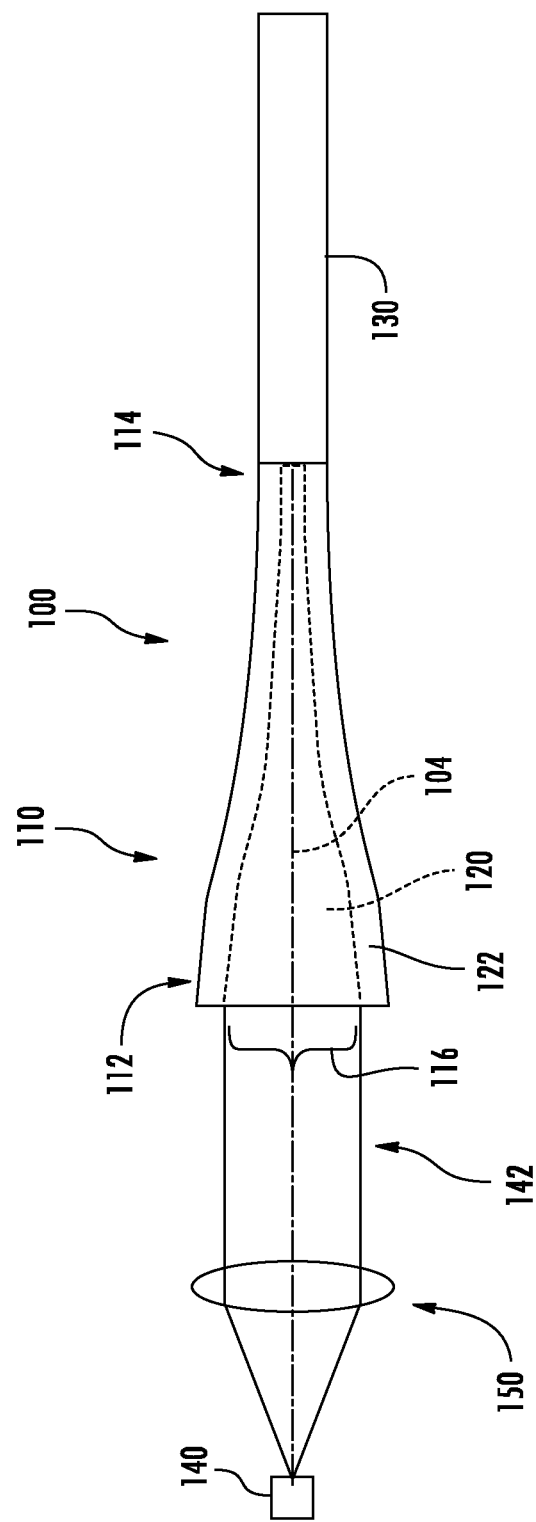
FIG. 1 schematically depicts an exemplary optical coupling system having a tapered coupling element according to one or more embodiments described herein.

Referring now to FIG. 1, a schematic view of an exemplary optical coupling system 100 is depicted. The optical coupling system 100 comprises a tapered coupling element 110 comprising a core 120 coupled to a cladding layer 122 that circumscribes the core 120. The tapered coupling element 110 is tapered from a larger first end 112 to a smaller second end 114 having taper shape that is linear, non-linear, exponential, half-Gaussian, s-shaped, or a combination thereof. In alternative embodiments, the tapered coupling element 110 may be reversed such that the first end 112 is smaller than the second end 114. The tapered coupling element 110 is positioned along an optical pathway 104 between a light source 140 and a receiving fiber 130, optically coupling the light source 140 and the receiving fiber 130 such that the optical pathway 104 traverses the tapered coupling element 110. Further, the optical coupling system 100 may include multiple tapered coupling elements 110.

Figure 2:
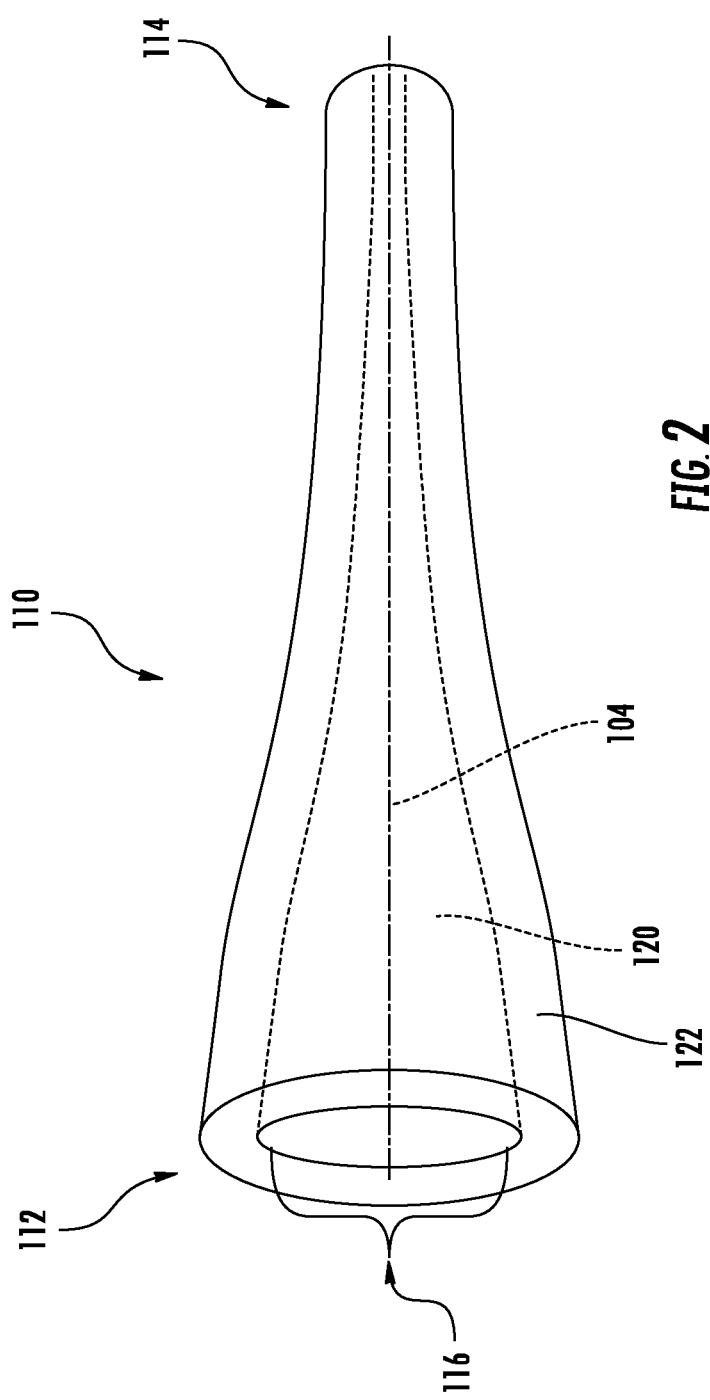
FIG. 2 schematically depicts an exemplary tapered coupling element according to one or more embodiments described herein.

Referring also to FIG. 2, the core 120 and cladding layer 122 of the tapered coupling element 110 of FIG. 1 are schematically depicted. The core 120 comprises a high index material, for example, silica having zero or more of an index raising dopant, such as Ge, P, Al, Ti, or the like. The cladding layer 122 comprises a low index material, for example, silica having zero or more of an index decreasing dopant such as F, B, or the like. The core 120 comprises a core diameter 116 that tapers such that the core diameter 116 is larger at the first end 112 than the second end 114. The taper shape of the core 120 may be the same taper shape as the tapered coupling element 110, for example, when the thickness of the cladding layer 122 is constant. The core 120 may also have a different taper shape than the tapered coupling element 110, for example, when the thickness of the cladding layer 122 is variable. In alternative embodiments, the tapered coupling element 110 may comprise multiple cores 120. In other embodiments, the cladding may comprise multiple cladding layers, for example, a low index trench in the cladding to better confine the light in core to reduce the power loss due to tapering.

Referring again to FIG. 1, the light source 140 may comprise a SiP laser, VCSEL laser, or another type of semiconductor laser. The light source 140 is optically coupled to the first end 112 of the tapered coupling element 110. The light source 140 emits the light beam 142 that travels along the optical pathway 104 into the first end 112 of the tapered coupling element 110. In some embodiments, a lens system 150 is positioned within the optical pathway 104 between the light source 140 and the first end 112 of the tapered coupling element 110. The lens system 150 may expand the light beam 142, for example, using a collimating lens to collimate and enlarge the optical field distribution of the light beam 142. In operation, once the light beam 142 passes through the lens system 150, it is directed into the tapered coupling element 110. In some embodiments, the diameter of the lens system 150 is substantially equivalent to, or less than, the core diameter 116 at the first end 112 of the tapered coupling element 110, and a numerical aperture of the lens system 150 may be substantially equivalent to or less than a numerical aperture at the second end 114 of the tapered coupling element 110 (defined as sine, where θ is the beam divergence angle), such that a substantial portion of the optical field distribution of the light beam 142 with a first beam size may enter the tapered coupling element 110, in particular, the core 120 and is transferred to a second beam size through the tapered coupling element 110.

The lens system 150 may additionally or alternatively comprise a spherical lens, an aspheric lens, a cylindrical lens, an anamorphic lens, a gradient index (GRIN) lens, a diffractive lens, a reverse tapered coupling element, or combinations thereof. The reverse tapered coupling element (FIG. 6D) may be the tapered coupling element 110, but positioned in a reverse orientation. The reverse tapered coupling element may comprise any of the materials and sizes of the tapered coupling element 110 described above. Further, the reverse tapered coupling element is configured to expand the light beam 142 as the light beam 142 traverses the reverse tapered coupling element. The lens system 150 may be factory aligned, for example, using passive alignment vision systems. This alignment can be done at the wafer level using lithography or wafer scale processing. The reverse tapered coupling element may be fabricated using a laser waveguide writing process with a vision system. In this embodiment, the laser writing process may form the alignment precision and an alignment procedure may not be required after the reverse tapered coupling element is fabricated. The lens system 150 may also use active alignment, which may increase alignment accuracy.

Figure 3:
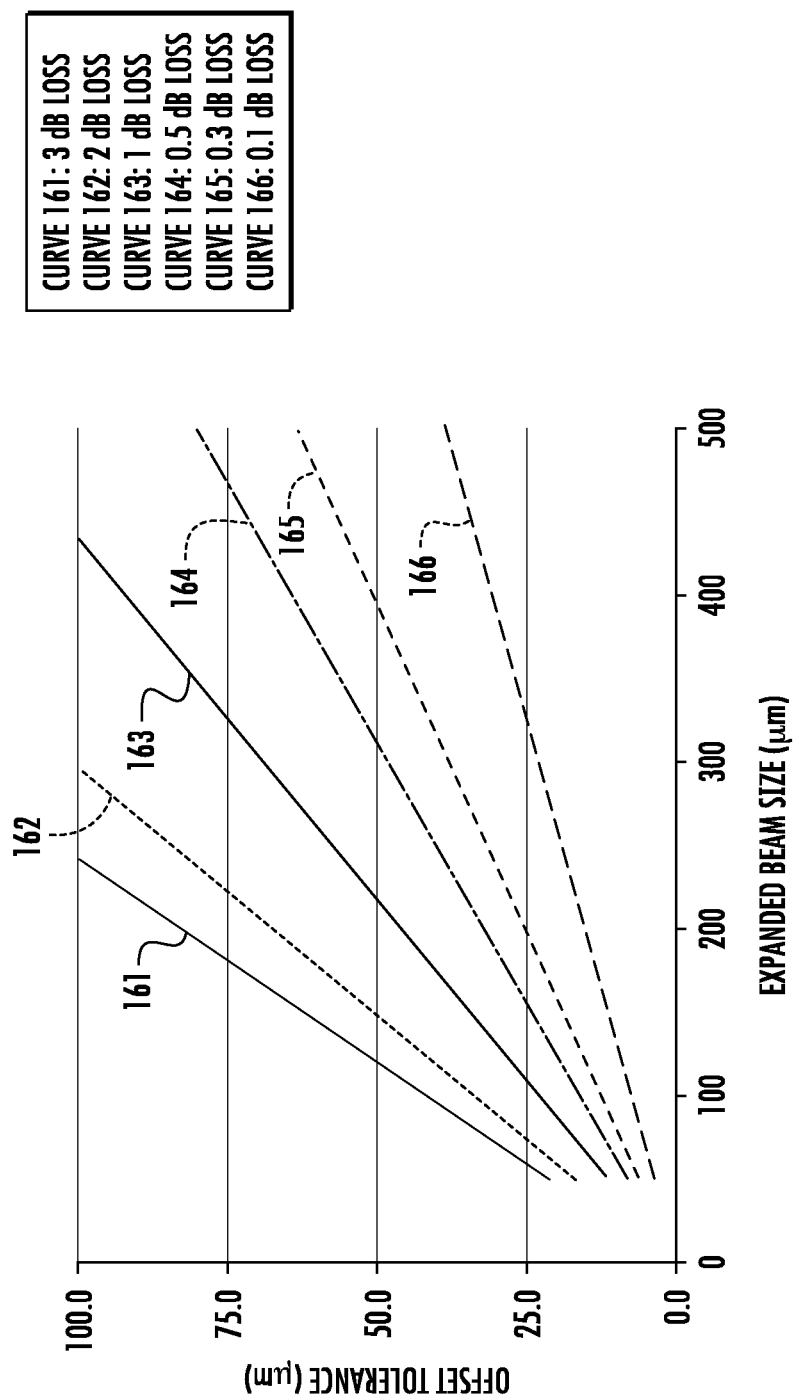
FIG. 3 depicts a graph measuring spatial offset tolerance vs. expanded beam size for a tapered coupling element according to one or more embodiments described herein.
Figure 4:
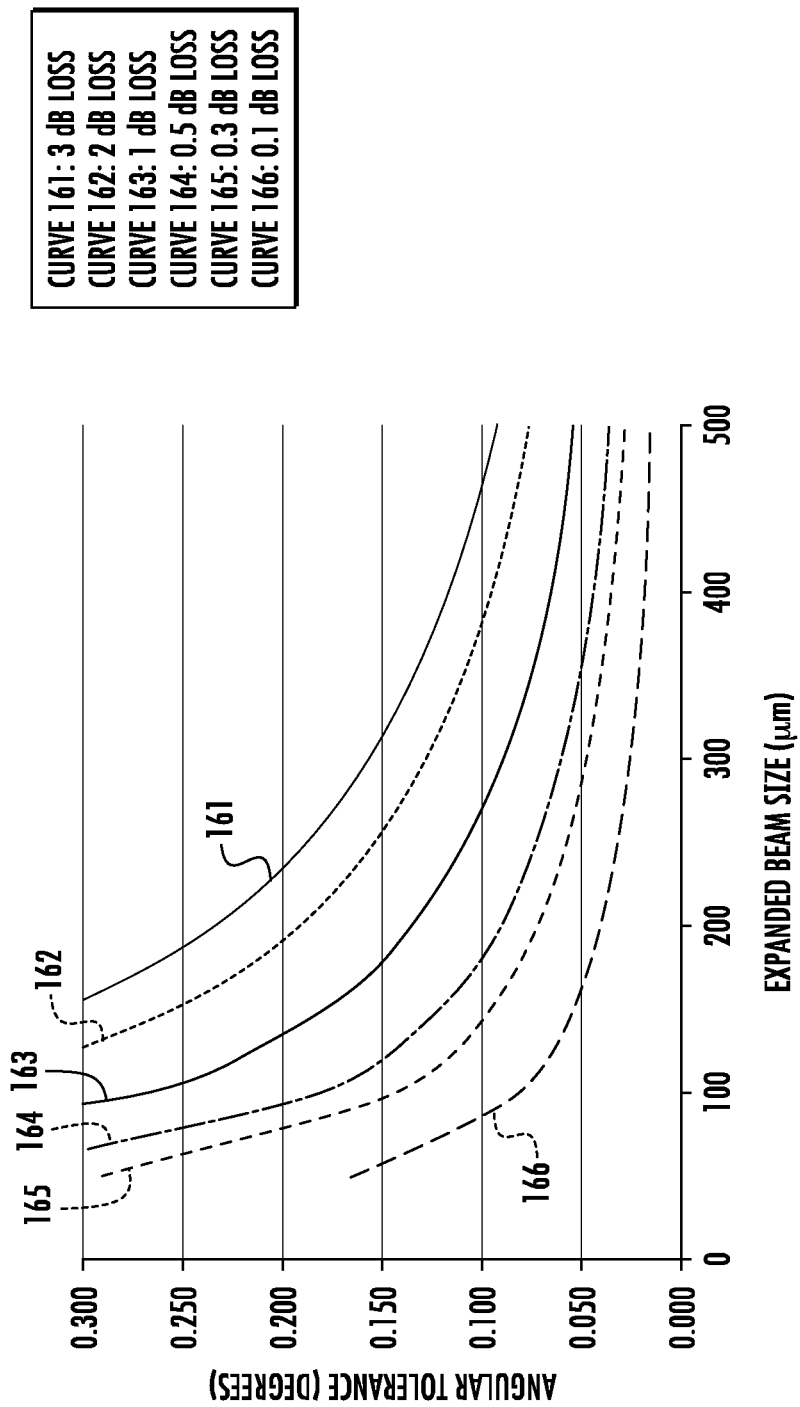
FIG. 4 depicts a graph measuring angular offset tolerance vs. expanded beam size for a tapered coupling element according to one or more embodiments described herein.

In some embodiments, the lens system 150 may be configured to align and match the light beam 142 with the core diameter 116 of the tapered coupling element 110 to minimize both the angular offset distance and the linear offset distance. The maximum angular and/or linear offset distance for optically coupling the light beam 142 to the tapered coupling element 110 with a desired amount of coupling loss is the offset tolerance. While not intending to be limited by theory, offset tolerance is the distance that the light beam 142 can be offset from perfect angular alignment or perfect linear alignment with the tapered coupling element 110 while remaining at or below a desired amount of coupling loss. Minimizing the angular offset distance and the linear offset distance can minimize coupling loss. FIGS. 3 and 4 graphically depict the angular and linear offset tolerance of a 1550 nm wavelength light beam 142 at varying beam sizes while retaining a set amount of coupling loss.

Referring now to FIG. 3, as the mode field diameter of the expanded light beam 142 increases, the linear alignment tolerance increases linearly. In particular, FIG. 3 depicts the amount of linear offset the light beam 142 can have while retaining different levels of coupling loss. For example, a light beam 142 with lower coupling loss, such as the 0.1 decibel (dB) coupling loss depicted by curve 166, has a smaller linear tolerance than a light beam 142 having a higher coupling loss, such as the 3 dB loss depicted by curve 161. FIG. 3 depicts the linear offset tolerance at different expanded beam sizes for six different coupling loss levels. Curve 161 depicts the linear offset tolerance and expanded light beam size relationship for a 3 dB coupling loss. Curve 162 depicts the linear offset tolerance and expanded light beam size relationship for a 2 dB coupling loss. Curve 163 depicts the linear offset tolerance and expanded light beam size relationship for a 1 dB coupling loss. Curve 164 depicts the linear offset tolerance and expanded light beam size relationship for a 0.5 dB coupling loss. Curve 165 depicts the linear offset distance tolerance and expanded light beam size relationship for a 0.3 dB coupling loss. Further, curve 166 depicts the linear offset distance tolerance and expanded light beam size relationship for a 0.1 dB coupling loss.

Referring now to FIG. 4, as the mode field diameter of the expanded light beam 142 increases, the angular alignment tolerance decreases nonlinearly. In particular, FIG. 4 depicts the amount of angular offset the light beam 142 can have while retaining different levels of coupling loss. For example, the light beam 142 having a lower coupling loss, such as the 0.1 dB coupling loss depicted by curve 166, has a smaller angular offset tolerance than the light beam 142 having a higher coupling loss, such as the 3 dB loss depicted by curve 161. Further, for each of these levels of coupling loss, as the mode field diameter of the light beam 142 increases, the angular offset tolerance decreases non-linearly. For example, the drop in angular offset tolerance is greater as the light beam 142 expands from about 100 µm to about 200 µm than the drop in angular offset tolerance from about 200 µm to about 300 µm. FIG. 4 depicts the angular offset tolerance at different expanded beam sizes for six different coupling loss levels. Curve 161 depicts the angular offset tolerance and expanded light beam size relationship for a 3 dB coupling loss. Curve 162 depicts the angular offset tolerance and expanded light beam size relationship for a 2 dB coupling loss. Curve 163 depicts the angular offset tolerance and expanded light beam size relationship for a 1 dB coupling loss. Curve 164 depicts the angular offset tolerance and expanded light beam size relationship for a 0.5 dB coupling loss. Curve 165 depicts the angular offset distance tolerance and expanded light beam size relationship for a 0.3 dB coupling loss. Further, curve 166 depicts the angular offset distance tolerance and expanded light beam size relationship for a 0.1 dB coupling loss.

In some embodiments, an optimal expanded beam mode field diameter may be chosen to produce a desired coupling loss by having both achievable linear and angular alignment tolerances. This may produce low coupling loss when optically coupling the light source 140 with a receiving fiber 130. For example, when optically coupling a light source and a single mode laser beam, an expanded light beam 142 having a mode field diameter between about 50 µm and 200 µm, such as 75 µm, 100 µm, and 150 µm, may be able to produce low levels of coupling loss and may increase the dust/contamination tolerance of the optical coupling system 100. In some embodiments, a contamination particle size in a non-controlled room environment ranges from about 2 µm to about 30 µm. The expanded beam size of the light beam 142 may need to be larger than the potential contamination particle size to minimize loss due to particle contamination within the optical pathway 104. When the mode field diameter is larger than 200 µm, the angular alignment tolerance becomes small for current cost-effective mechanical designs for single mode connectors.

Referring again to FIG. 1, the receiving fiber 130 may comprise an optical fiber, such as, for example, a single mode optical fiber, multimode optical fiber, multimode multi-core optical fiber, or the like. The receiving fiber 130 is optically coupled to the second end 114 of the tapered coupling element 110. In some embodiments, an optical core diameter (OCD) of the receiving fiber 130 is equivalent the core diameter 116 at the second end 114 of the tapered coupling element 110. The second end 114 of the tapered coupling element 110 may be attached to the receiving fiber 130 using fusion splicing, mechanical splicing, or the like. In operation, matching the core diameter 116 at the second end 114 of the tapered coupling element 110 with the OCD of the receiving fiber 130 facilitates alignment and attachment, and also optically couples the tapered coupling element 110 and the receiving fiber 130 such that the optical pathway 104 enters the receiving fiber 130 with minimal coupling loss. In particular, the tapered coupling element 110 is configured such that the numerical aperture (NA) and the core diameter 116 at the second end 114 of the tapered coupling element 110 are close to or match the NA and the OCD of the receiving fiber 130.

In operation, the first end 112 of the tapered coupling element 110 can receive a light beam 142 emitted by the light source 140 having a first beam size and taper the light beam 142 to a second beam size at the second end 114 of the tapered coupling element 110. The second beam size may be smaller than the first beam size and, in some embodiments, the second beam size may be substantially equal to the diameter of the receiving fiber 130. The first end 112 of the tapered coupling element 110 may support more modes than the second end 114 of the tapered coupling element 110. In one embodiment, a majority of the light beam 142 from the light source 140 may be coupled to one or more desired modes at the first end 112 (i.e. the larger end) of the tapered coupling element 110 to minimize insertion loss through the tapered coupling element 110. The desired modes at the first end 112 are the number of lower order modes that are equal to or less than the number of modes supported by the second end 114. In some embodiments, if a higher order mode outside the desired modes is excited, the light positioned in that higher order mode is lost through the tapered coupling element 110 as it is not supported by the second end 114. Accordingly, coupling the light beam 142 from the light source 140 to the desired modes reduces the insertion loss through the tapered coupling element 110. The tapered coupling element 110 has a tapered core diameter 116 that may adiabatically transition the light beam 142 traversing the tapered coupling element 110. In particular, the tapered shape of the core diameter 116 may transition the light beam 142 from the first beam size to the second beam size while the light beam 142 remains at one of the one or more of the desired modes. Adiabatic transition provides light beam 142 transition having low propagation loss and no mode coupling to undesired higher order modes. For example, the light beam 142 at the first end 112 and at the second end 114 of the tapered coupling element 110 may be one of the one or more desired modes.

While not intending to be limited by theory, the core diameter 116 adiabatically transitions the light beam 142 along the optical pathway 104 such that a propagation loss within the tapered coupling element may be, for example, less than about 1 dB, less than about 0.5 dB, or less than about 0.1 dB. To achieve adiabatic transition, the slope of the diameter of the core 120 (i.e. the taper shape) may satisfy the condition of Equation 1, below. In some embodiments, the slope of the core diameter 116 should not be too steep.

$$\frac{dD}{dz} \leq \frac{D}{\lambda}(n_m - n_{m'}) \quad (1)$$

In Equation 1, D is the core diameter 116, λ is the wavelength of the light beam 142, $n_m$ is the effective index of an m mode group, $n_{m'}$ is the effective index of an m' mode group, and z is distance along the length of the tapered coupling element 110. The m mode group and the m' mode group are adjacent mode groups of the light beam 142 having a wavelength of λ in the core 120, i.e. m'=m+1. The m mode group and the m' mode group can be any adjacent mode groups within the core 120 for the light beam 142. In particular, the m mode group and the m' mode group are the two adjacent mode groups of the light beam 142 having the most similar effective indexes at a point along the length of the tapered coupling element 110. While not intended to be limited by theory, the two mode groups m and m' are two mode groups within the light beam 142 having refractive indexes that make the value $(n_m-n_{m'})$ smallest. Further, it should be understood that, with respect to these adjacent mode groups, $n_m$ has a larger effective index than $n_{m'}$, such that the value is a positive value. In some embodiments, the mode group number m is equivalent to the number of mode groups supported by the second end 114 of the tapered coupling element 110. Accordingly, the slope of the core diameter 116 may be calculated from the Equation 1. Further, Equation 1 may be used to determine both the taper shape and the taper length given the core diameter 116 at the first end 112 and the second end 114 of the tapered coupling element 110.

Figure 5:
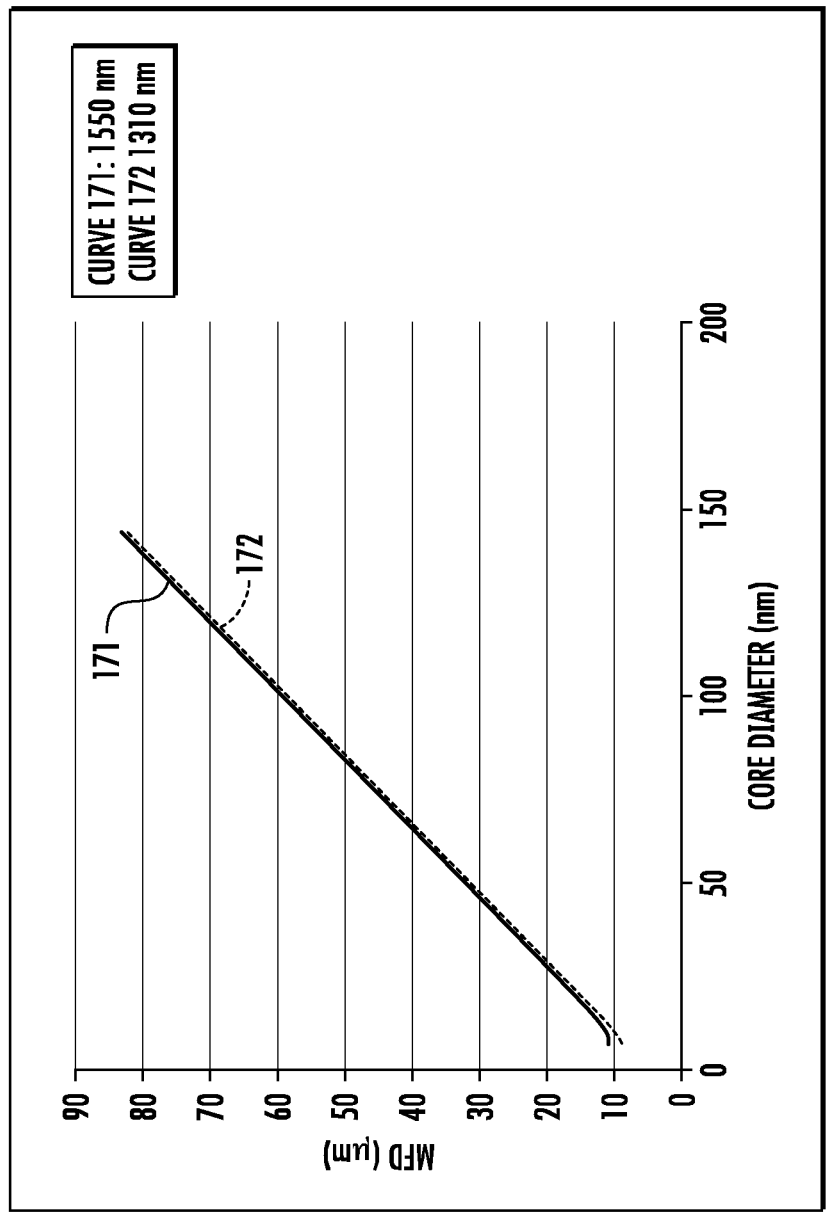
FIG. 5 depicts a graph measuring the mode field diameter change as a function of core diameter of a tapered coupling element according to one or more embodiments described herein.

Referring now to FIG. 5, mode field diameter (MFD) as a function of core diameter for the fundamental mode of an example light beam 142 is graphically depicted. In FIG. 5, curve 171 represents a light beam 142 with a wavelength of 1550 nm and curve 172 represents a light beam 142 having a wavelength of 1310 nm. In this non-limiting example, the tapered coupling element 110 is designed to optically couple a light source 140 and a single mode receiving fiber 130. This exemplary tapered coupling element 110 has a step index profile design similar to standard single mode fiber that includes a core delta of 0.34%. In this example, the core diameter 116 at the first end 112 is about 82 μm and the core diameter 116 at the second end 114 is about 8.8 μm to optically couple a collimated light beam 142 having a 50 μm MFD into a single mode receiving fiber 130 having a core diameter of about 8.8 μm with minimal coupling loss.

In operation, as the core diameter 116 decreases, the MFD of the light beam 142 decreases. When the light beam 142 reaches the second end 114, (having a core diameter of about 8.8 μm), the MFD of a 1310 nm light beam 142 and 1550 nm light beam 142 are 9.3 μm and 10.4 μm, respectively. This matches the MFD of standard single mode optical fiber. Further, in this example, the cladding layer diameter should be about 1.18 mm at the first end 112 and about 125 μm at the second end 114, which matches the cladding diameter of standard single mode fiber. Although having the same cladding diameter at the end of 114 as the receiving fiber 130 diameter is not required to achieve low coupling loss, it may simplify a fusion splice or a mechanical splice procedure at the joint between the taper end 114 and the receiving fiber 130. Further, in this example, the length of the tapered coupling element 110 should be greater than about 8 mm to facilitate an adiabatic transition, for example 10 mm, 12 mm, 15 mm, or the like.

In another example, the tapered coupling element 110 may be configured to optically couple a light source 140 and a multi-mode receiving fiber 130 such that the light beam 142 undergoes adiabatic transition through the tapered coupling element 110. In this example, the receiving fiber 130 comprises a graded index multi-mode fiber having a core delta of 0.75%, an alpha of about 2, and core diameter of about 30 μm. The tapered coupling element 110 comprises a core delta of 0.75% and an alpha of about 2. In this example, the first end 112 of the tapered coupling element may have a core diameter 116 of 150 μm and a cladding layer diameter of 625 μm. The second end 114 of the tapered coupling element 110 may have a core diameter 116 of 30 μm and a cladding layer diameter of 125 μm. Further, the length of the tapered coupling element 110 should be greater than about 3.8 mm to facilitate adiabatic transition, for example, 4 mm, 6 mm, 8 mm, or the like. It should be understood that tapered coupling element 110 may comprise a variety of core refractive index profiles, core deltas and core sizes to couple a variety of light sources 140 and receiving fibers 130. The core refractive index profile, can be a step index profile, a graded index profile or multi-segmented index profile. The core delta can be between 0.2 to 3%, and may be between 0.3 to 2%, and may even be between 0.3 to 1%. In particular, the size relationships of the tapered coupling element 110 should meet the conditions of Equation 1, above.

In an alternative embodiment, the optical coupling system 100 may be configured to optically couple a light source 140 comprising an array of laser/VCSEL sources and a receiving fiber 130 comprising a multi-core optical fiber. In this embodiment, the lens system 150 is telecentric and the tapered coupling element 110 comprises multiple cores 120. In a different embodiment, the lens system 150 could be a reversed tapered coupling element having multiple tapered cores. In this embodiment, each core diameter of the multiple cores 120 may meet the limitations of Equation 1 to facilitate adiabatic transition of a light beam 142 produced by the array of laser/VCSEL sources.

In some embodiments, the tapered coupling element 110 may be fabricated from a glass cane having a designed core profile with a cane diameter between about 500 μm and 3000 μm and a core diameter between about 50 μm and 1000 μm. The tapered coupling element 110 may be fabricated from the glass cane using a triple phase electrode electrical arc having ion production regions, ion recombination regions, and a radiant heat region. In operation, the glass cane may be placed in cane holder clamps, the triple electrode electrical arc may locally heat the glass cane and tension may be applied in opposite directions, tapering the glass cane and forming the tapered coupling element 110. During the fabrication process, the core diameter 116 and the length of the tapered coupling element 110 is programmed into the fabrication equipment, which calculate the required cane holder speed to ensure a constant or variable taper slope. Once the target core diameter 116 is achieved, the speed of the holders may be changed such that a waist region having a constant diameter is formed. The waist region provides a location for cleaving. Further, after fabrication is complete, the tapered coupling element 110 may be cleaved using an ultrasonic cleaving blade, a laser cleaver, or the like. After the cleaving process, the tapered coupling element 110 may undergo a fusion splice process to couple the tapered coupling element 110 to a receiving fiber 130.

In additional embodiments depicted in FIGS. 6A-6D, example optical coupling systems 200 having a light source connector 270, a tapered coupling element connector 280 and a receiving fiber connector 290 are depicted. In the embodiments depicted in FIGS. 6A-6D, the light source connector 270 includes a light source housing 272 for housing a light source 240, the tapered coupling element connector 280 includes a tapered coupling element housing 282 for housing the tapered coupling element 210, and the receiving fiber connector 290 includes a receiving fiber housing 292 for housing the receiving fiber 230. In some embodiments, the light source connector 270, the tapered coupling element connector 280 and the receiving fiber connector 290 are integral. In other embodiments they are coupled together using a connector interface, for example, any exemplary metal or plastic connecting device. Further, each end of the tapered coupling element connector 280 may be polished.

In the embodiments depicted in FIGS. 6A-6D, the tapered coupling element 210 may comprise an embodiment of the tapered coupling element 110 described above, and may be secured within the tapered coupling element housing 282 using one or more ferrules 262. The ferrules 262 may comprise ceramic material, plastic material, metal material, or the like. The ferrules 262 may consist of two or more ferrule segments, or and individual ferrule with a tapered hole that matches the shape of the tapered coupling element 110. The receiving fiber 230 may comprise the various receiving fibers 130 described above and may be secured within the receiving fiber housing 292 using one or more ferrules 262. Further, the light source 240 may comprise the various light sources 140 described above.

Figure 6A:
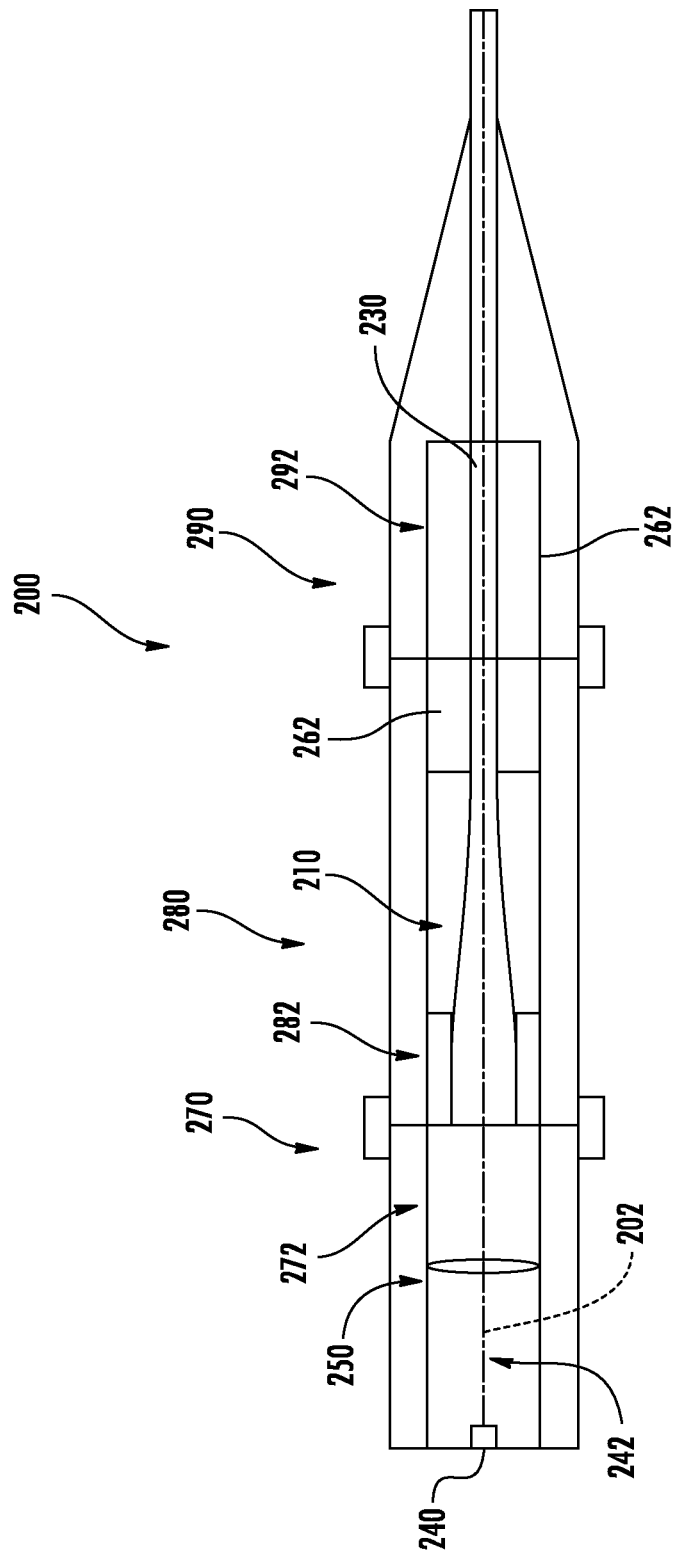
FIG. 6A depicts a schematic view of an exemplary optical coupling system having a tapered coupling element according to one or more embodiments described herein.
Figure 6B:
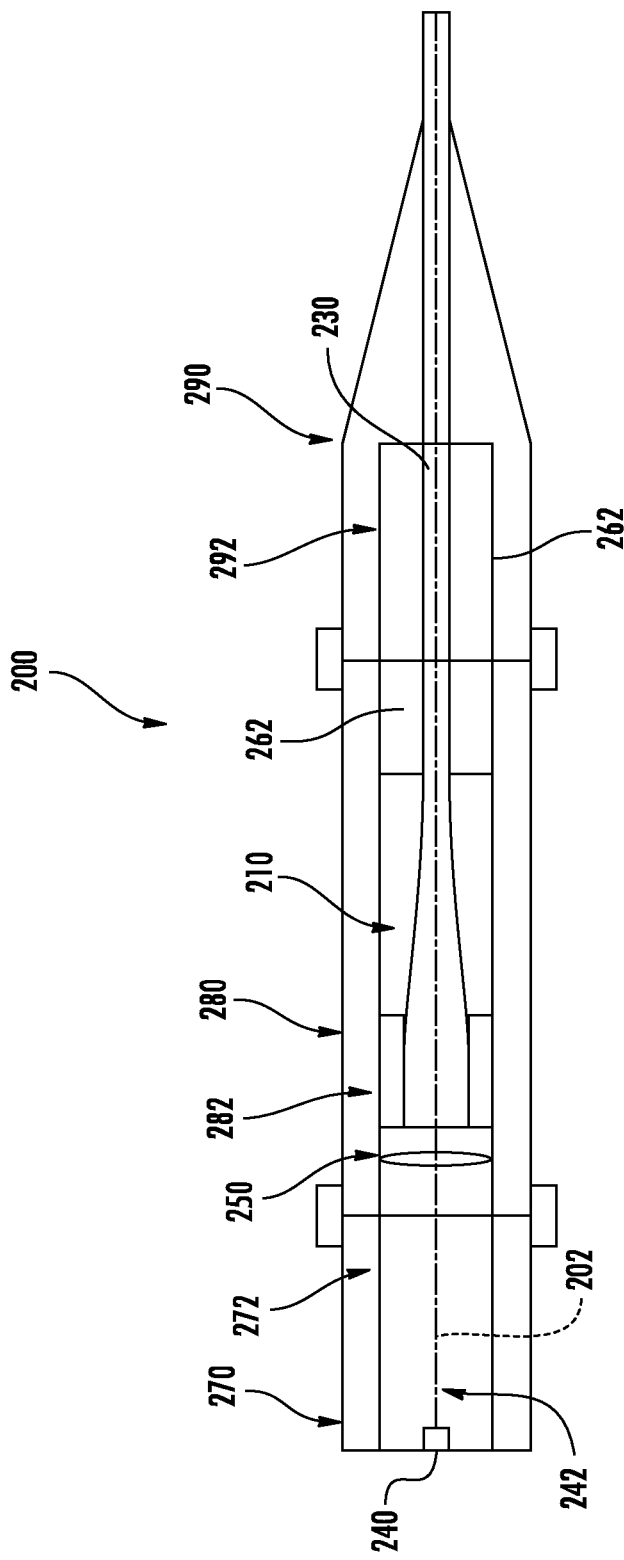
FIG. 6B depicts a schematic view of another exemplary optical coupling system having a tapered coupling element according to one or more embodiments described herein.
Figure 6C:
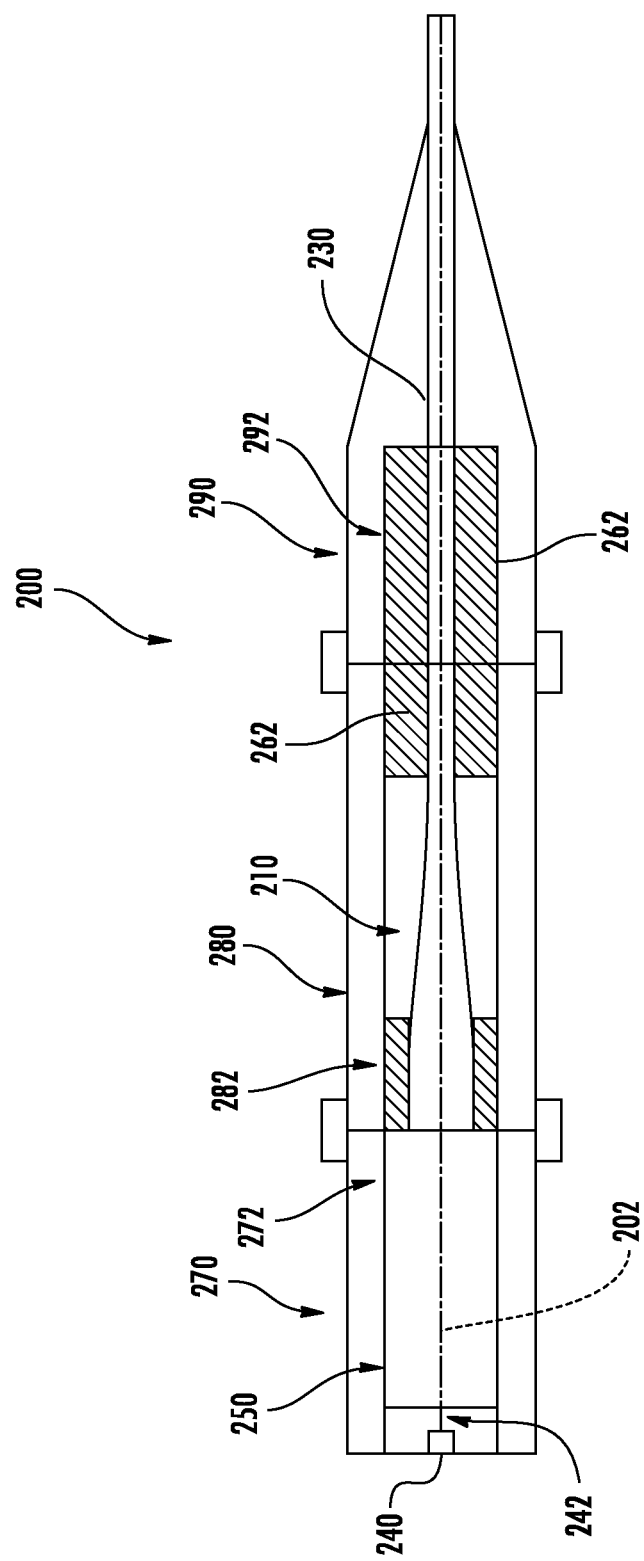
FIG. 6C depicts a schematic view of an exemplary optical coupling system having a tapered coupling element and a GRIN lens according to one or more embodiments described herein.
Figure 6D:
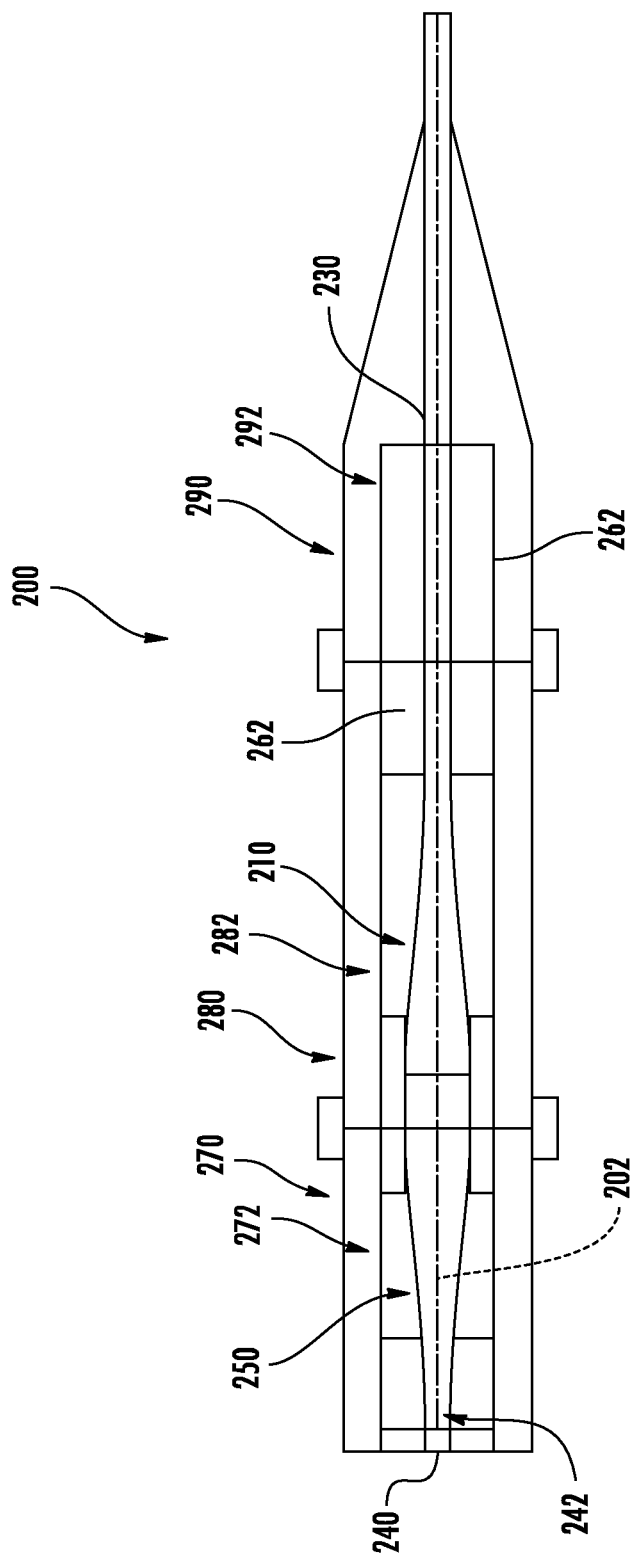
FIG. 6D depicts a schematic view of an exemplary optical coupling system having a tapered coupling element and a reverse tapered coupling element according to one or more embodiments described herein.

The illustrated optical coupling systems 200 further comprise a lens system 250, such as the lens system 150 described above and illustrated in FIG. 2. The lens system 250 may be housed within the light source housing 272 or the tapered coupling element housing 282 and positioned within an optical pathway 202 between the light source 240 and the tapered coupling element 210. In FIG. 6A, the lens system 250 comprises a collimating lens positioned within the light source connector 270. In FIG. 6B, the lens system 250 comprises a collimating lens positioned within the tapered coupling element connector 280. In FIG. 6C, the lens system 250 comprises a GRIN lens, configured to expand the light beam 242 and positioned within the light source connector 270. In FIG. 6D, the lens system 250 comprises a reverse tapered coupling element configured to expand the beam and secured within the light source housing 272 using one or more ferrules 262.

Figure 7:
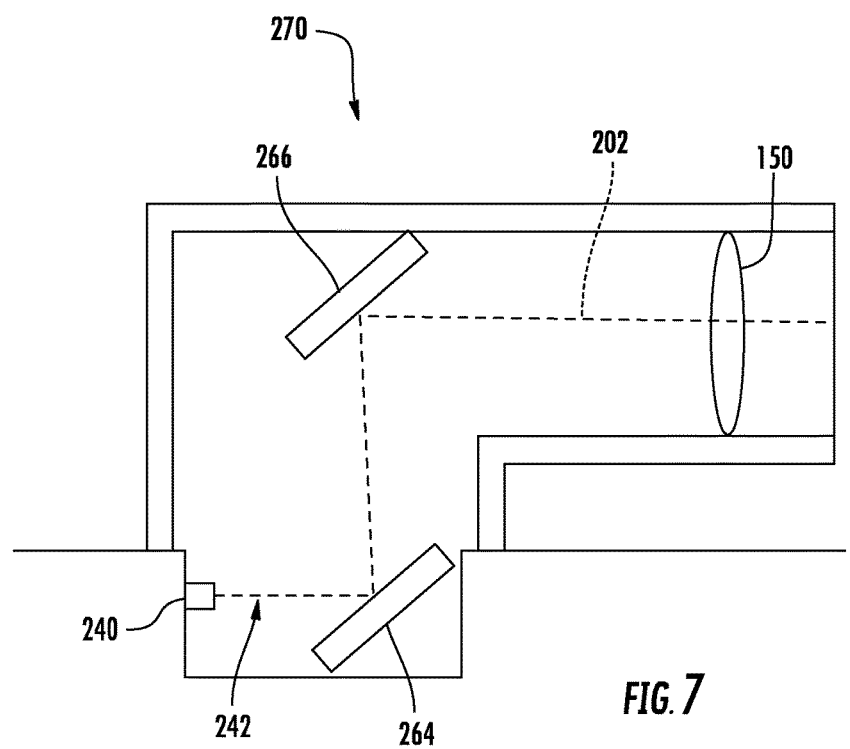
FIG. 7 depicts a schematic view of an exemplary light source connector according to one or more embodiments described herein.

Referring now to FIG. 7, an alternative embodiment of the light source connector 270 is depicted. In this embodiment, the light source connector 270 comprises two reflective mirrors 264, 266 configured to direct the light beam 142 into the lens system 250, for example, when the light source 240 and the lens system 250 are not directly aligned. Further, the light source connector 270 may be mounted to a laser module board. In some embodiments, the two reflective mirrors 264, 266 and lens system 150 may be a single molded part, and the light is reflected using total internal reflection.

It should now be understood that optical coupling systems may have a tapered coupling element to optically couple a light source and a receiving fiber. The tapered coupling element may be positioned along an optical pathway between the light source and the receiving fiber and may have a tapered shape to adiabatically transition a light beam from a first beam size to a second beam size as the light beam traverses the tapered coupling element. Further, a lens system may be positioned within the optical pathway between the light source and the tapered coupling element and may collimate the light beam to align the light beam such that it can be linearly and angularly aligned with the tapered coupling element. While not intended to be limited by theory, the optical coupling system may minimize both coupling loss and propagation loss of a light beam traversing between a light source and a receiving fiber.

It is noted that the term "substantially" may be utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. An optical coupling system comprising:
a tapered coupling element comprising;
  a first end opposite a second end;
  a core comprising a core diameter that is larger at the first end than at the second end;
  a cladding layer coupled to and circumscribing the core; and
  an optical pathway disposed within the core and extending between the first end and the second end, wherein the tapered coupling element is tapered from the first end to the second end such that the core diameter adiabatically transitions a light beam traveling along the optical pathway from a first beam size at the first end to a second beam size at the second end;
wherein a slope of the core diameter of the tapered coupling element is determined by a relationship $$\frac{dD}{dz} \leq \frac{D}{\lambda}(n_m - n_{m'}),$$

where:
D is the core diameter at a location along a length of the tapered coupling element;
$\lambda$ is a wavelength of the light beam;
$n_m$ is an effective index of a first mode group;
$n_{m'}$ is the effective index of a second mode group, and
z is the distance along the length of the tapered coupling element, wherein the first mode group and the second mode group comprise adjacent mode groups of the light beam at the location along the length of the tapered coupling element.

2. The optical coupling system of claim 1, wherein:
the light beam at the first end of the tapered coupling element has one of one or more desired modes; and the core diameter adiabatically transitions the light beam such that a mode the light beam at the second end of the tapered coupling element is one of the one or more desired modes.

3. The optical coupling system of claim 1, wherein the core diameter adiabatically transitions the light beam such that a mode of the light beam at the second end of the tapered coupling element is the same as a mode of the light beam at the first end of the tapered coupling element.

4. The optical coupling system of claim 1, wherein the core diameter adiabatically transitions the light beam along the optical pathway such that a propagation loss within the tapered coupling element is less than 1 dB.

5. The optical coupling system of claim 1, wherein:
the core comprises silica with zero or more of refractive index raising dopants Ge, P, Al, and Ti; and
the cladding layer comprises silica with zero or more of refractive index decreasing dopants F and B.

6. An optical coupling system comprising:
a light source optically coupled to a first end of a tapered coupling element, wherein the light source is configured to generate a light beam;
a lens system disposed within an optical pathway between the light source and the first end of the tapered coupling element, the tapered coupling element comprising:
the first end opposite a second end;
a core comprising a core diameter that is larger at the first end than at the second end;
a cladding layer coupled to and circumscribing the core; and
the optical pathway disposed within the core and extending between the first end and the second end, wherein the tapered coupling element is tapered from the first end to the second end such that the core diameter adiabatically transitions the light beam traveling along the optical pathway from a first beam size at the first end to a second beam size at the second end; and
a receiving fiber optically coupled to the second end of the tapered coupling element;
wherein a slope of the core diameter of the tapered coupling element is determined by a relationship $$\frac{dD}{dz} \leq \frac{D}{\lambda}(n_m - n_{m'}),$$

where:
D is the core diameter at a location along a length of the tapered coupling element;
$\lambda$ is a wavelength of the light beam;
$n_m$ is an effective index of a first mode group;
$n_{m'}$ is the effective index of a second mode group, and
z is the distance along the length of the tapered coupling element, wherein the first mode group and the second mode group comprise adjacent mode groups of the light beam at the location along the length of the tapered coupling element.

7. The optical coupling system of claim 6, wherein:
the light beam at the first end of the tapered coupling element has one of one or more desired modes; and
the core diameter adiabatically transitions the light beam such that a mode the light beam at the second end of the tapered coupling element is one of the one or more desired modes.

8. The optical coupling system of claim 6, wherein the core diameter adiabatically transitions the light beam such that a mode of the light beam at the second end of the tapered coupling element is the same as a mode of the light beam at the first end of the tapered coupling element.

9. The optical coupling system of claim 6, wherein the core diameter adiabatically transitions the light beam along the optical pathway such that a propagation loss within the tapered coupling element is less than 1 dB.

10. The optical coupling system of claim 6, wherein:
the core comprises silica with zero or more of refractive index raising dopants Ge, P, Al, and Ti; and
the cladding layer comprises silica with zero or more of refractive index decreasing dopants F and B.

11. The optical coupling system of claim 6, wherein the lens system comprises at least one of a collimating lens, a spherical lens, an aspheric lens, a cylindrical lens, an anamorphic lens, a gradient index lens, a diffractive lens, or a reverse tapered coupling element.

12. The optical coupling system of claim 6, wherein the receiving fiber comprises a single mode optical fiber, multimode optical fiber, or multimode multi-core optical fiber.

13. The optical coupling system of claim 12, wherein an optical core diameter of the receiving fiber is substantially equivalent to the core diameter at the second end of the tapered coupling element.

14. The optical coupling system of claim 6, wherein the second end of the tapered coupling element is optically coupled to the receiving fiber by fusion coupling.

15. An optical coupling system comprising:
a light source connector comprising a light source housing and a light source disposed within the light source housing and optically coupled to a first end of a tapered coupling element, wherein the light source is configured to generate a light beam;
a lens system disposed within an optical pathway between the light source and the first end of the tapered coupling element;
a tapered coupling element connector comprising a tapered coupling element housing, wherein the tapered coupling element is disposed within the tapered coupling element housing, the tapered coupling element comprising:
the first end opposite a second end;
a core comprising a core diameter that is larger at the first end than at the second end;
a cladding layer coupled to and circumscribing the core; and
the optical pathway disposed within the core and extending between the first end and the second end, wherein the tapered coupling element is tapered from the first end to the second end such that the core diameter adiabatically transitions the light beam traveling along the optical pathway from a first beam size at the first end to a second beam size at the second end; and
a receiving fiber connecter comprising a receiving fiber housing and a receiving fiber disposed within the receiving fiber housing and optically coupled to the second end of the tapered coupling element;
wherein a slope of the core diameter of the tapered coupling element is determined by a relationship $$\frac{dD}{dz} \leq \frac{D}{\lambda}(n_m - n_{m'}),$$

where:
D is the core diameter at a location along a length of the tapered coupling element;
$\lambda$ is a wavelength of the light beam;
$n_m$ is an effective index of a first mode group;
$n_{m'}$ is the effective index of a second mode group, and
z is the distance along the length of the tapered coupling element, wherein the first mode group and the second mode group comprise adjacent mode groups of the light beam at the location along the length of the tapered coupling element.

16. The optical coupling system of claim 15, wherein:
the light beam at the first end of the tapered coupling element has one of one or more desired modes; and
the core diameter adiabatically transitions the light beam such that a mode the light beam at the second end of the tapered coupling element is one of the one or more desired modes.

17. The optical coupling system of claim 15, wherein the core diameter adiabatically transitions the light beam such that a mode of the light beam at the second end of the tapered coupling element is the same as a mode of the light beam at the first end of the tapered coupling element.

18. The optical coupling system of claim 15, wherein the core diameter adiabatically transitions the light beam along the optical pathway such that a propagation loss within the tapered coupling element is less than 1 dB.

19. The optical coupling system of claim 15, wherein:
the core comprises silica with zero or more of refractive index raising dopants Ge, P, Al, and Ti; and
the cladding layer comprises silica with zero or more of refractive index decreasing dopants F and B.

20. The optical coupling system of claim 15, wherein the lens system comprises at least one of a collimating lens, a spherical lens, an aspheric lens, a cylindrical lens, an anamorphic lens, a gradient index lens, or a reverse tapered coupling element.

21. The optical coupling system of claim 15, wherein the receiving fiber comprises a single mode optical fiber, multimode optical fiber, or multimode multi-core optical fiber.

22. The optical coupling system of claim 21, wherein an optical core diameter of the receiving fiber is substantially equivalent to the core diameter at the second end of the tapered coupling element.

* * * * *